US012007759B2

(12) United States Patent
Gawlick et al.

(10) Patent No.: US 12,007,759 B2
(45) Date of Patent: Jun. 11, 2024

(54) GEOMETRIC AGING DATA REDUCTION FOR MACHINE LEARNING APPLICATIONS

(71) Applicant: Oracle International Corporation, Redwood Shores, CA (US)

(72) Inventors: Dieter Gawlick, Palo Alto, CA (US); Matthew Torin Gerdes, Oakland, CA (US); Kirk Bradley, San Francisco, CA (US); Anna Chystiakova, Sunnyvale, CA (US); Zhen Hua Liu, San Mateo, CA (US); Guang Chao Wang, San Diego, CA (US); Kenny C. Gross, Escondido, CA (US)

(73) Assignee: Oracle International Corporation, Redwood Shores, CA (US)

( * ) Notice: Subject to any disclaimer, the term of this patent is extended or adjusted under 35 U.S.C. 154(b) by 430 days.

(21) Appl. No.: 17/361,189

(22) Filed: Jun. 28, 2021

(65) Prior Publication Data

US 2022/0413481 A1 Dec. 29, 2022

(51) Int. Cl.
*G05B 23/02* (2006.01)
*G06F 11/34* (2006.01)
(Continued)

(52) U.S. Cl.
CPC ...... *G05B 23/0283* (2013.01); *G06F 11/3409* (2013.01); *G06F 16/215* (2019.01); *G06F 18/2148* (2023.01); *G06N 20/00* (2019.01)

(58) Field of Classification Search
CPC ............ G05B 23/0283; G05B 23/0221; G05B 23/024; G06F 11/3409; G06F 18/2148;
(Continued)

(56) References Cited

U.S. PATENT DOCUMENTS 6,188,831 B1 * 2/2001 Ichimura .............. H04N 5/9265
386/E5.013
7,167,812 B1 * 1/2007 Urmanov ............ G06F 11/3089
702/183
(Continued)

OTHER PUBLICATIONS

Brito et al., "An Explainable Artificial Intelligence Approach for Unsupervised Fault Detection and Diagnosis in Rotating Machinery", arxiv.org, Cornell University Library, 201 Olin Library Cornell University Ithaca, NY 14853, Feb. 23, 2021, 25 Pages.
(Continued)

*Primary Examiner* — Farley Abad
(74) *Attorney, Agent, or Firm* — Invoke

(57) ABSTRACT

Techniques for geometric aging data reduction for machine learning applications are disclosed. In some embodiments, an artificial-intelligence powered system receives a first time-series dataset that tracks at least one metric value over time. The system then generates a second time-series dataset that includes a reduced version of a first portion of the time-series dataset and a non-reduced version of a second portion of the time-series dataset. The second portion of the time-series dataset may include metric values that are more recent than the first portion of the time-series dataset. The system further trains a machine learning model using the second time-series dataset that includes the reduced version of the first portion of the time-series dataset and the non-reduced version of the second portion of the time-series dataset. The trained model may be applied to reduced and/or non-reduced data to detect multivariate anomalies and/or provide other analytic insights.

20 Claims, 14 Drawing Sheets

(51) Int. Cl.
*G06F 16/215* (2019.01)
*G06F 18/214* (2023.01)
*G06N 20/00* (2019.01)

(58) Field of Classification Search
CPC .............. G06F 11/3006; G06F 11/3452; G06F 16/24568; G06F 18/15; G06F 18/213; G06F 16/215; G06N 20/00; G16Y 40/20
See application file for complete search history.

(56) References Cited

U.S. PATENT DOCUMENTS

| | | | | |
|---|---|---|---|---|
| 8,346,914 | B2* | 1/2013 | Vaidyanathan | G06N 20/00 709/224 |
| 11,366,844 | B2* | 6/2022 | Bhave | G06F 16/258 |
| 2017/0339022 | A1* | 11/2017 | Hegde | H04L 41/06 |
| 2018/0349790 | A1* | 12/2018 | Cai | G06N 20/00 |
| 2019/0236162 | A1* | 8/2019 | Gross | G06F 16/2477 |

OTHER PUBLICATIONS

Gross et al., "AI Decision Support Prognostics for IoT Asset Health Monitoring, Failure Prediction, Time to Failure", 2019 International Conference on Computational Science and Computational Intelligence (CSCI), IEEE, Dec. 5, 2019, pp. 244-248.

Lundberg et al., "A Unified Approach to Interpreting Model Predictions", arxiv.org, Cornell University Library, 201 Olin Library Cornell University Ithaca, NY 14853, Nov. 25, 2017, 10 Pages.

* cited by examiner

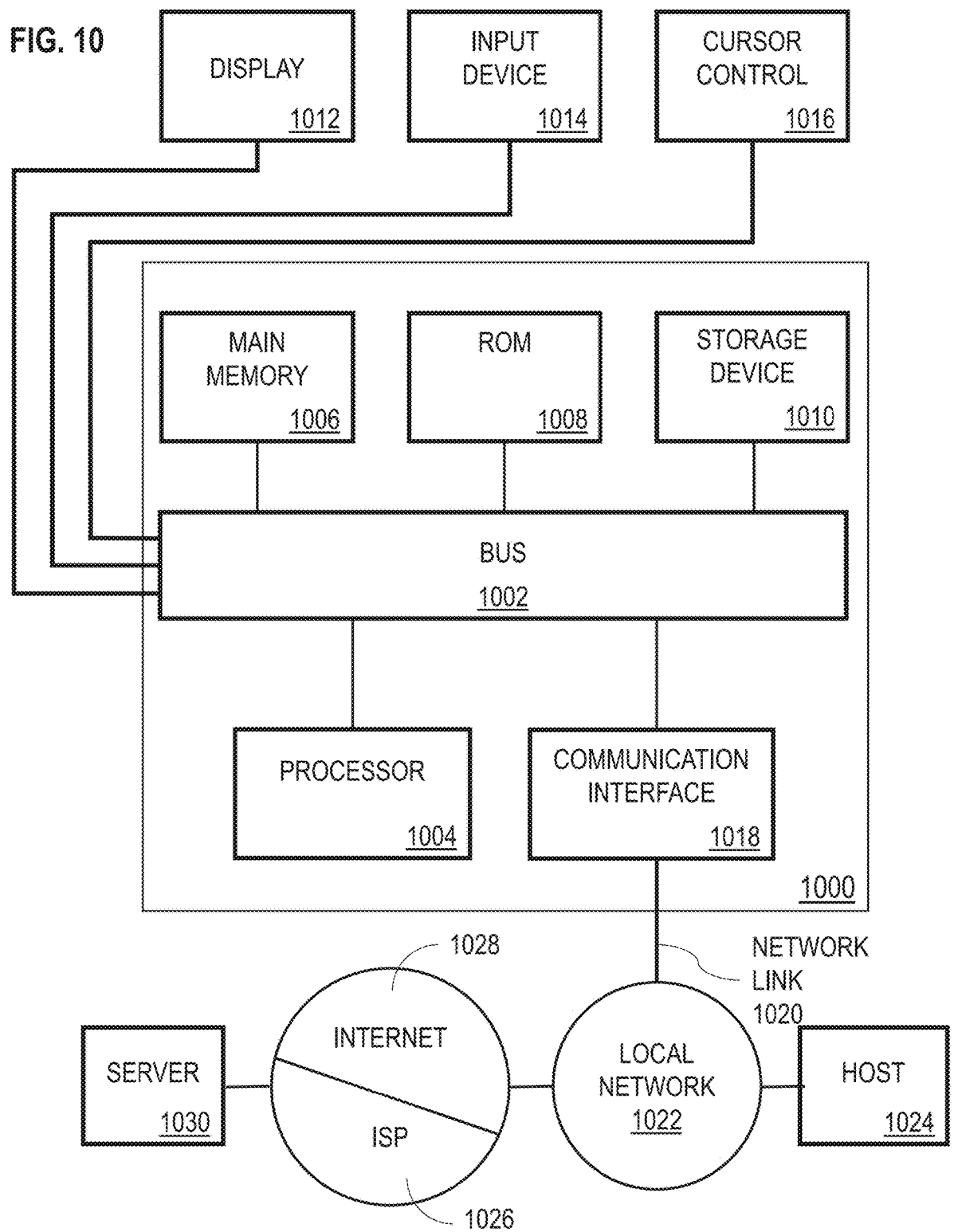

US 12,007,759 B2

GEOMETRIC AGING DATA REDUCTION FOR MACHINE LEARNING APPLICATIONS

RELATED APPLICATIONS; INCORPORATION BY REFERENCE

This application is related to U.S. Pat. No. 5,764,509, titled "Industrial Process Surveillance System"; U.S. Pat. No. 6,470,333, titled "Knowledge Extraction System and Method"; and U.S. Pat. No. 7,281,112, titled "Method for Storing Long-Term Performance Data in a Computer System with Finite Storage Space", the entire contents for each of which are incorporated by reference as if set forth in their entirety.

TECHNICAL FIELD

The present disclosure relates to techniques for generating compressed and reduced datasets for machine learning applications.

BACKGROUND

The widespread adoption of dense-sensor Internet-of-Things (IoT) applications across many commercial and government industries has resulted in a significant accumulation of archived time-series data. Analyzing these time-series, which are often terabytes or petabytes in size, is not feasible for a human analyst. Further, with telemetry from sensors that monitor power plants and other safety-critical assets, human errors and subjectivity may lead to dangerous outcomes.

Machine learning (ML) and deep learning (DL) algorithms may help provide insights into time-series data that would not be readily apparent or feasible for human analysts to extrapolate from the raw telemetry data. These algorithms may further guide or automatically initiate actions to reduce the likelihood of errors leading to suboptimal outcomes. A challenge with ML models is that as technology improves, more industries are likely to transmit more telemetry signals from wireless sensors at ever-higher sampling rates. Due to the vast amount of data, many storage systems may be required to compress the data to reduce the storage overhead of the time-series data. However, many compression algorithms remove features of a time-series signal that may prevent ML models from extrapolating and applying useful statistical insights.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 10 shows a block diagram that illustrates a computer system in accordance with one or more embodiments.

DETAILED DESCRIPTION

Figure 1:
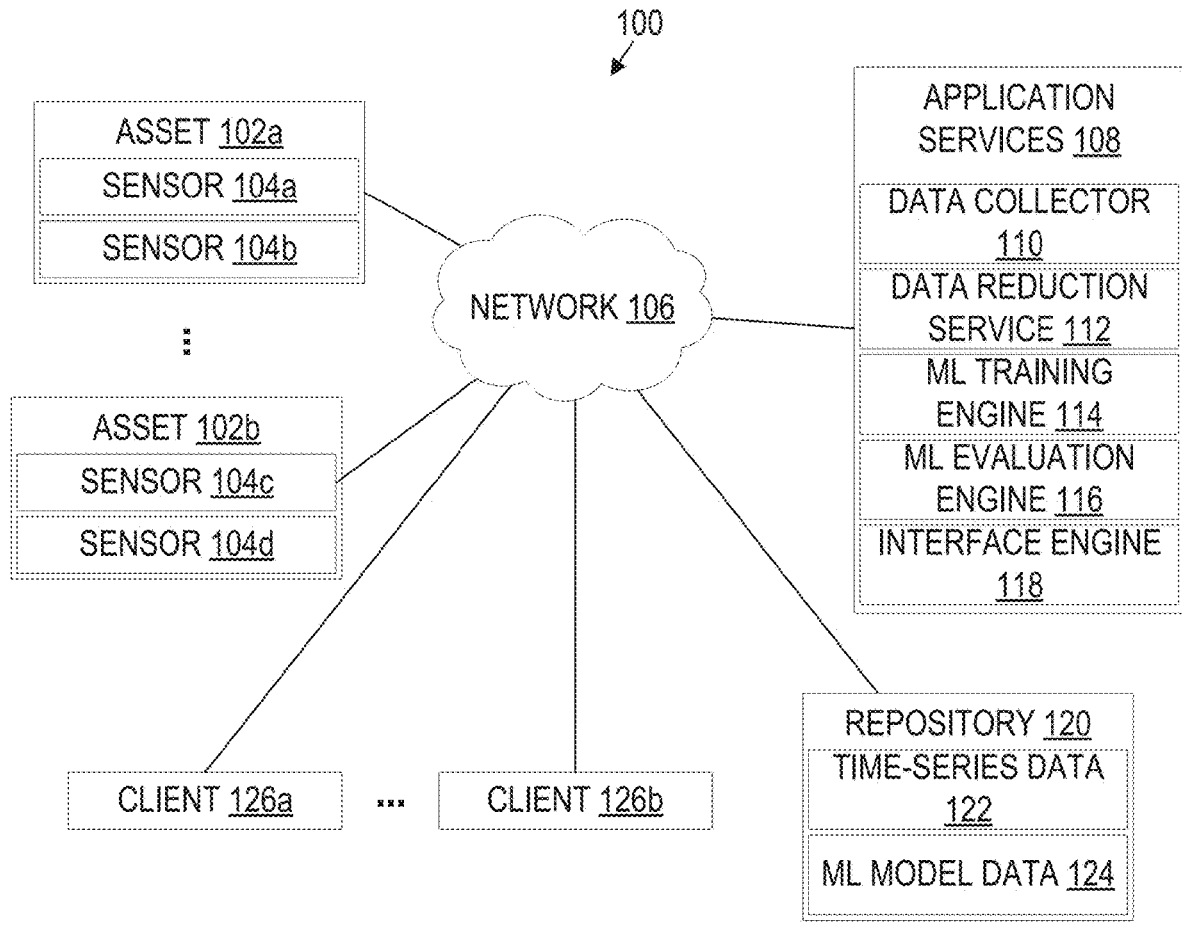
FIG. 1 illustrates a system for training and applying machine learning models in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GEOMETRIC AGING DATA REDUCTION AND COMPRESSION
4. INTEGRATION WITH MACHINE-LEARNING MODELS
5. EXAMPLE SIGNAL REDUCTION AND ML MODEL PERFORMANCE
6. COMPUTER NETWORKS AND CLOUD NETWORKS
7. MICRO SERVICE APPLICATIONS
8. HARDWARE OVERVIEW
9. MISCELLANEOUS; EXTENSIONS

1. GENERAL OVERVIEW

Before the utilization of remote data storage, dedicated servers were often tasked with storing streaming data from embedded sensors monitoring assets such as bridges, manufacturing plants, or nuclear power plants. A data scientist or engineer, with the help of a machine learning (ML) model, might regularly examine the output of the sensors for anomalies to determine if the asset required maintenance or replacement. A secondary task might include determining when to expunge aging and innocuous observations when server storage limits were about to be exceeded.

As cloud storage services become more commonplace, corporations and other entities are passing the challenges of data storage and analysis to cloud service providers. Large entities may have thousands or more assets with millions of sensors with high-frequency sampling rates. As a result, cloud service providers may be tasked with the ability to perform large-scale ML prognostics, such as analytics on petabyte or exabyte scale time-series signals. However, storing the raw telemetry data for several different cloud service subscribers may be cost prohibitive.

Techniques are provided herein for statistically compressing or reducing continuously streaming signals to extend data storage limits in a manner amenable to training and applying ML models. In some embodiments, a geometric aging data reduction process, also referred to herein as geometric aging compression (GAC), is applied to time-series signals to reduce storage overhead costs. The GAC process may reduce data geometrically as a function of data age. For example, time-series data that is not older than a first threshold age may remain uncompressed while data older than the threshold age may be reduced by applying GAC.

In some embodiments, a system applies GAC reduction multiple times as the data become older. For example, GAC may be applied twice to data older than a second threshold age, three times to data older than a third threshold age, etc. As a result, the storage consumption of time-series data may be geometrically compressed. For instance, data within the most recent time window may remain uncompressed, and data in the next oldest time windows may be compressed by a factor of two, four, eight, sixteen, etc. according to a geometric pattern.

In some embodiments, the GAC process reduces data by averaging adjacent values in a time-series. For example, to reduce a section of a time-series by two, the GAC process may cluster adjacent values into groups of two, add the observations in a group together and divide by two. Compressing signals in this manner preserves the trends in the signal and correlation patterns between different signals.

Techniques are further described herein for using GAC reduced data to train and apply ML models. By preserving, in the compressed data, the statistical features and patterns that are present in the uncompressed data, the compressed data may be effectively used to train and evaluate ML models. Thus, ML models may be trained and applied without "decompressing" the data, which reduces both storage overhead and processing times of implementing ML and DL algorithms over large datasets.

One or more embodiments described in this Specification and/or recited in the claims may not be included in this General Overview section.

2. ARCHITECTURAL OVERVIEW

In some embodiments, the techniques described herein operate on time-series signals. A time-series generally comprises a collection of data points that captures information over time. The source of a time-series signal and the type of information that is captured may vary from implementation to implementation. For example, a time-series may be collected from one or more software and/or hardware resources and capture various performance attributes of the resources from which the data was collected. As another example, a time-series signal may comprise a collection of sample data points that are captured using one or more sensors that measure physical properties, such as temperature, pressure, motion, traffic flow, or other attributes of an object or environment.

FIG. 1 illustrates a system for training and applying machine learning models in accordance with some embodiments. As illustrated in FIG. 1, system 100 includes assets 102a-b, application services 108, data repository 120 and clients 126a-b. In some embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Assets 102a-b represent target resources that are subject to monitoring. In some embodiments, an asset corresponds to a complex system with embedded sensors, such as sensors 104a-d. Example assets may include airplanes, bridges, manufacturing plants, nuclear power plants, biological organisms, datacenters, server appliances, and other computing systems.

Sensors 104a-d may include devices, modules, or subsystems that capture metrics relevant to the health, performance, and/or other attributes of an asset. For example, a computing system may include sensors that measure central processing unit (CPU) utilization, CPU temperature, memory throughput, input/output (I/O) operations per second, network latency, storage consumption, and/or other metric values. As another example, a nuclear reactor may include sensors that measure core damage frequency (CDF), large early release frequency (LERF), residual heat removal, power changes, and/or other metric values. Although only two sensors and assets are illustrated in FIG. 1, the number of assets and sensors-per-asset may vary depending on the particular implementation. Additionally, the metric values and other time-series data that are captured by the sensors may vary from implementation to implementation.

In some embodiments, sensors 104a-d are communicatively coupled with application services 108 via network 106. Network 106 represents one or more interconnected data communication networks, such as the Internet. Sensors 104a-d may be associated with one or more processors, such as daemons, that send collected time-series data points over network 220 to application services 108 according to one or more communication protocols. Example communication protocols that may be used to transport data between the agents and application services 108 may include the hypertext transfer protocol (HTTP), simple network management protocol (SNMP), and other communication protocols of the internet protocol (IP) suite. Data points may be continuously streamed to application services 108, be provided periodically in batches, or be provided on demand depending on the particular implementation.

In some embodiments, application services 108 includes a set of services that may be invoked to process time-series data. Application services 108 may include data collector 110, data reduction service 112, ML training engine 114, ML evaluation engine 116, and interface engine 118. Each component of application services 108 may implement a different functionality or set of functions for processing time series data. As previously mentioned, the components within system 100, including application services 108 may vary. In some cases, a function performed by one component may be combined or otherwise implemented by another component within system 100. Additionally or alternatively, the components of application services 108 may execute locally or remotely from one another.

Data collector 110 may aggregate collected data points received from different sensors such that the data points are recorded or otherwise stored to indicate a sequential order based on time. Data collector 110 may maintain data points received from one sensor as a separate time-series signal from data received from another sensor and/or combine measurements from two or more sensors into a single time-series signal. Thus, a given time-series may be constructed from data points generated by a single sensor or multiple sensors.

In some embodiments, data reduction service 112 applies GAC to time-series signals to reduce the storage overhead of the collected data. ML training engine 114 may use the reduced data to train one or more ML models, such as forecasting models, baselining and anomaly detection models, and correlation prediction models. ML evaluation engine 116 may tune and apply the ML models to newly received time-series data or hypothetical time-series data. The output from applying the ML model may be used to trigger alerts, generate recommendations, and/or initiate downstream automated actions.

In some embodiments, data repository 120 is any type of storage unit and/or device (e.g., a file system, database, collection of tables, or any other storage mechanism) for storing data. Further, data repository 120 may include multiple different storage units and/or devices. The multiple different storage units and/or devices may or may not be of the same type or located at the same physical site. Further, data repository 120 may be implemented or may execute on the same computing system as one or more other components of system 100. Alternatively or additionally, data repository 120 may be implemented or executed on a computing system separate from one or more components of system 100. Data repository 120 may be communicatively coupled to other system components via a direct connection and/or via network 106.

In some embodiments, data repository 120 includes volatile and/or non-volatile storage for storing time-series data 122 and ML model data 124. Time-series data 122 may include compressed and/or uncompressed time-series signals. When GAC is applied, a portion of a time-series signal may be uncompressed (also referred to herein as "non-reduced") while one or more other portions may be compressed (also referred to herein as "reduced") at varying levels as a function of age. ML model data 124 may store model artifacts and outputs. For example, ML model data 124 may store weights, biases, hyperparameter values, and/or other artifacts obtained through model training. Additionally or alternatively, ML model data 124 may include estimated labels, forecasted values, residuals, and/or other values from obtained from evaluating and applying a trained ML model.

Clients 125*a-b* represent one or more clients that may access application services 108 to detect and characterize time series data. A "client" in this context may be a human user, such as an administrator, a client program, or some other application interface. A client may execute locally on the same host as application services 108 or may execute on a different machine. If executing on a different machine, the client may communicate with application services 108 via network 106 according to a client-server model, such as by submitting HTTP requests invoking one or more of the services and receiving HTTP responses comprising results generated by one or more of the services.

Interface engine 118 may provide a user interface for interacting with application services 108. Example user interface may comprise, without limitation, a graphical user interface (GUI), an application programming interface (API), a command-line interface (CLI) or some other interface that allows users to invoke one or more of application services 108 to process time-series data. Clients 126*a-b* may render user interface element items provided through interface engine 118. For example, a client may be a browser, mobile app, or application frontend that displays user interface elements for invoking one or more of application services 108 through a GUI window. Examples of user interface elements include checkboxes, radio buttons, drop-down lists, list boxes, buttons, toggles, text fields, date and time selectors, command lines, sliders, pages, and forms.

Components of system 100 may be implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In some embodiments, application services 108 are exposed through a cloud service or a microservice. A cloud service may support multiple tenants, also referred to as subscribing entities. A tenant may correspond to a corporation, organization, enterprise or other entity that accesses a shared computing resource, such as application services 108. Different tenants may be managed independently even though sharing computing resources. For example, different tenants may have different account identifiers, access credentials, identity and access management (IAM) policies, and configuration settings. Additional embodiments and/or examples relating to computer networks and microservice applications are described below in Section 6, titled "Computer Networks and Cloud Networks," and Section 7, titled "Microservice Applications."

3. GEOMETRIC AGING DATA REDUCTION AND COMPRESSION

In some embodiments, data reduction service 112 applies GAC to reduce the storage consumption of time-series data. With GAC, data storage consumption is reduced geometrically as a function of age. Thus, older data within a time-series signal is more greatly compressed than more recent data in the same time-series signal. The most recent data in the time-series signal may remain uncompressed.

In some embodiments, GAC reduces a time-series data sets by averaging or otherwise merging adjacent data points. For example, GAC may separate observations corresponding to even and odd indices, add the observations together, and divide by two. The result is a compressed time-series where pairwise observations are averaged, halving the number of data points. In the examples provided herein, observations are merged in pairs. However, GAC may merge more than two adjacent data points in a time-series together, depending on the particular implementation. For instance, three adjacent observations may be summed and then divided by three. Thus, the number of adjacent data points and aggregation function used to merge the data points may vary depending on the particular implementation.

Figure 2:
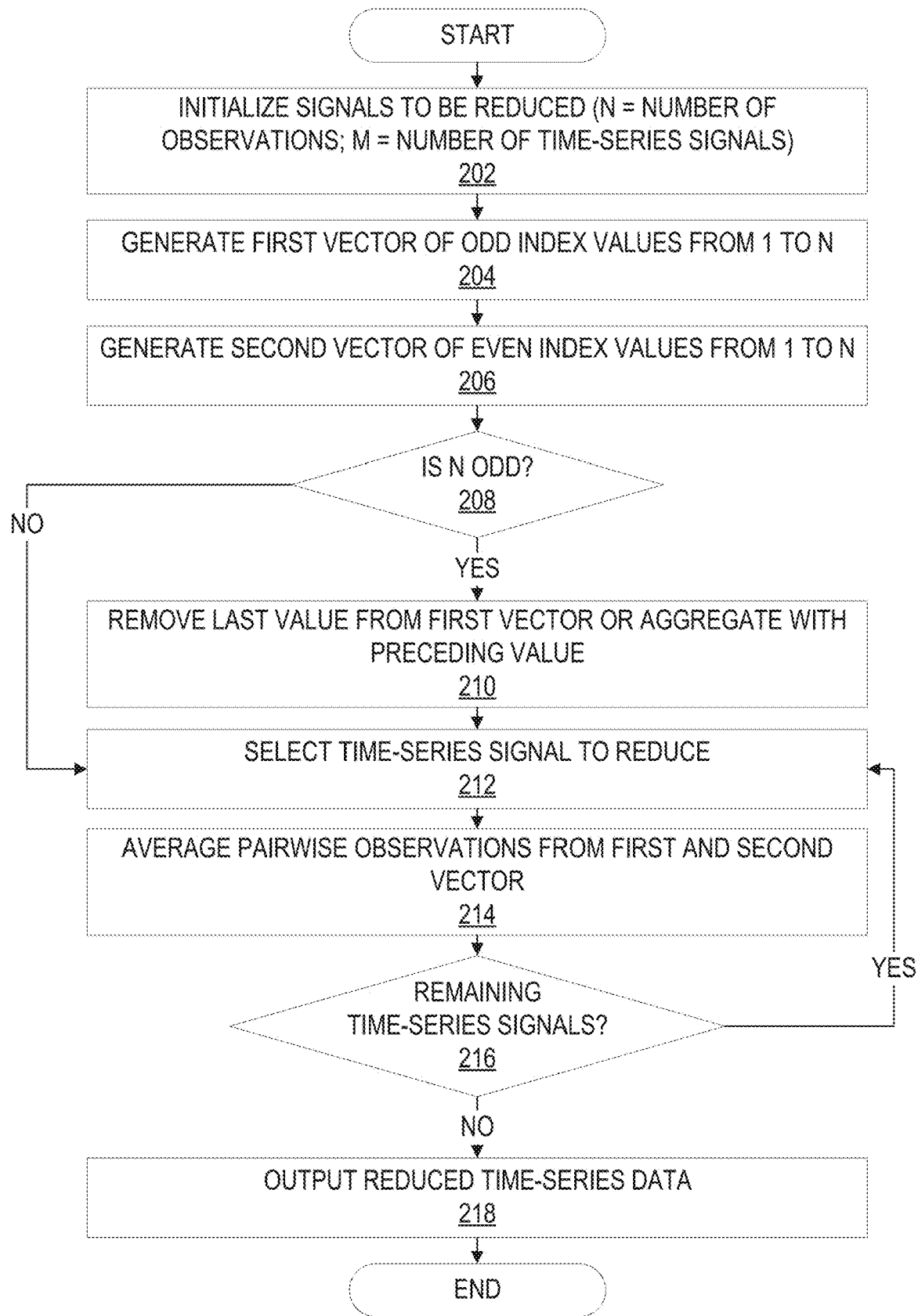
FIG. 2 illustrates an example process for geometric aging data reduction in accordance with some embodiments.

FIG. 2 illustrates an example process for geometric aging data reduction in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

Referring to FIG. 2, the GAC process includes initializing a set of time-series data to be reduced (operation 202). In some embodiments, the GAC process identifies or forms an N×M matrix of time-series data, where N corresponds to the number of observations per time-series signal and M corresponds to the number of time-series signals. Each row or column of the matrix may correspond to a different time-series with metric values captured by one or more embedded sensors. For example, one row (or column) may correspond to CPU utilization rates, another row memory throughput, etc. The time-series signals in each row may be time aligned with the oldest values first and the most recent values last.

The GAC process next generates a first vector of odd index values from 1 to N (operation 204). For example, if there are 10 sample values in each of the M time-series signals, then the vector may include five values: the $1^{st}$, $3^{rd}$, $5^{th}$, $7^{th}$ and $9^{th}$ observations of each signal. Thus, when there are an even number of observations, the length of the vector is half of the initialized matrix.

The GAC process also generates a second vector of even index values from 2 to N (operation 206). In the preceding example with 10 sample values, the second vector may also include five values: the $2^{nd}$, $4^{th}$, $6^{th}$, $8^{th}$, and $10^{th}$ observations of each signal. As may be appreciated, the number of sample values may be much greater than 10 for sensors with high sampling rates.

In some embodiments, the GAC process determines whether there are an odd number of observations (operation 208). If there are an odd number of observations, then the first vector will have one more value per time-series signal than the second vector. If there were only 9 sample values, for instance, the length of the first vector would include five values while the second vector would include four values.

If there are an odd number of observations, then the GAC process removes the last value from the first vector or aggregates the value with the preceding value (operation 210). Generally, removing one observation does not significantly impact the incipience of degradation in an asset, especially when processing a significant number of sample values. Therefore, removing the final value may be acceptable. In other cases, the last value may be averaged with the preceding value or flagged to be aggregated in a subsequent step.

Once the even and odd vectors have been generated, the GAC process selects a time-series signal to reduce (operation 212). For example, if there are M time-series signals in the initial N×M matrix, then the GAC process start with the first column in the matrix (M=1) and iterate through each column. However, the time-series signals may be processed in any order.

The GAC process next averages the pairwise observations from the even and odd vectors (operation 214). For example, the GAC process may average the first value in the odd vector with the first value in the even vector, followed by the second value in each vector, etc. The result is a compressed time-series where pairwise observations are grouped ($1^{st}$ and $2^{nd}$, $3^{rd}$ and $4^{th}$, up to N−1 to N) and averaged. Compressing time-series signals in this manner preserves statistical information including trends and correlation patterns.

The process determines whether there are any remaining time-series signals to reduce (operation 216). If signals remain, then the GAC process is looped over the number of signals, which may correspond to the number of sensors, and carried out M times until the signal database is compressed.

Once the GAC process is run over the remaining time-series signals, the process outputs the reduced time-series data (operation 218). In some embodiments, the output of the GAC process is a (N/2) by M matrix of time-series signals. Thus, the number of data points in the input matrix is effectively halved, reducing the storage overhead.

As new sensor data is received, the uncompressed data may be added to the compressed data. If a storage threshold is reached, then the GAC process may be run again to further reduce the data. If run again, the portion of the time-series data that has already been reduced by half is further reduced by again merging adjacent data points in the reduced portion of time-series data. As a result, the N/2 data points in the reduced portion are compressed to N/4 data points. The uncompressed data appended to the reduced dataset is reduced to N/2. Thus, the reduced time-series dataset includes the following: (a) a multiple (twice) reduced version of the oldest data points compressed to N/4 data points; (b) a single reduced version of a second portion of the time-series dataset that is more recent than the twice-reduced portion; and (c) a non-reduced (uncompressed) version of the most recent portion of the time-series dataset.

The process may be run again such that different time windows are compressed at varying levels as a function of age. For instance, a time-series may include an uncompressed version for the most recent time window, a second time window with 2 times compression for the next oldest portion of the uncompressed time-series dataset, a third time window with 4 times compression for the next oldest portion of the time-series dataset, a third time window with 8 times compression, and so on with each successive time window being compressed $2^N$ times.

Figure 3A:
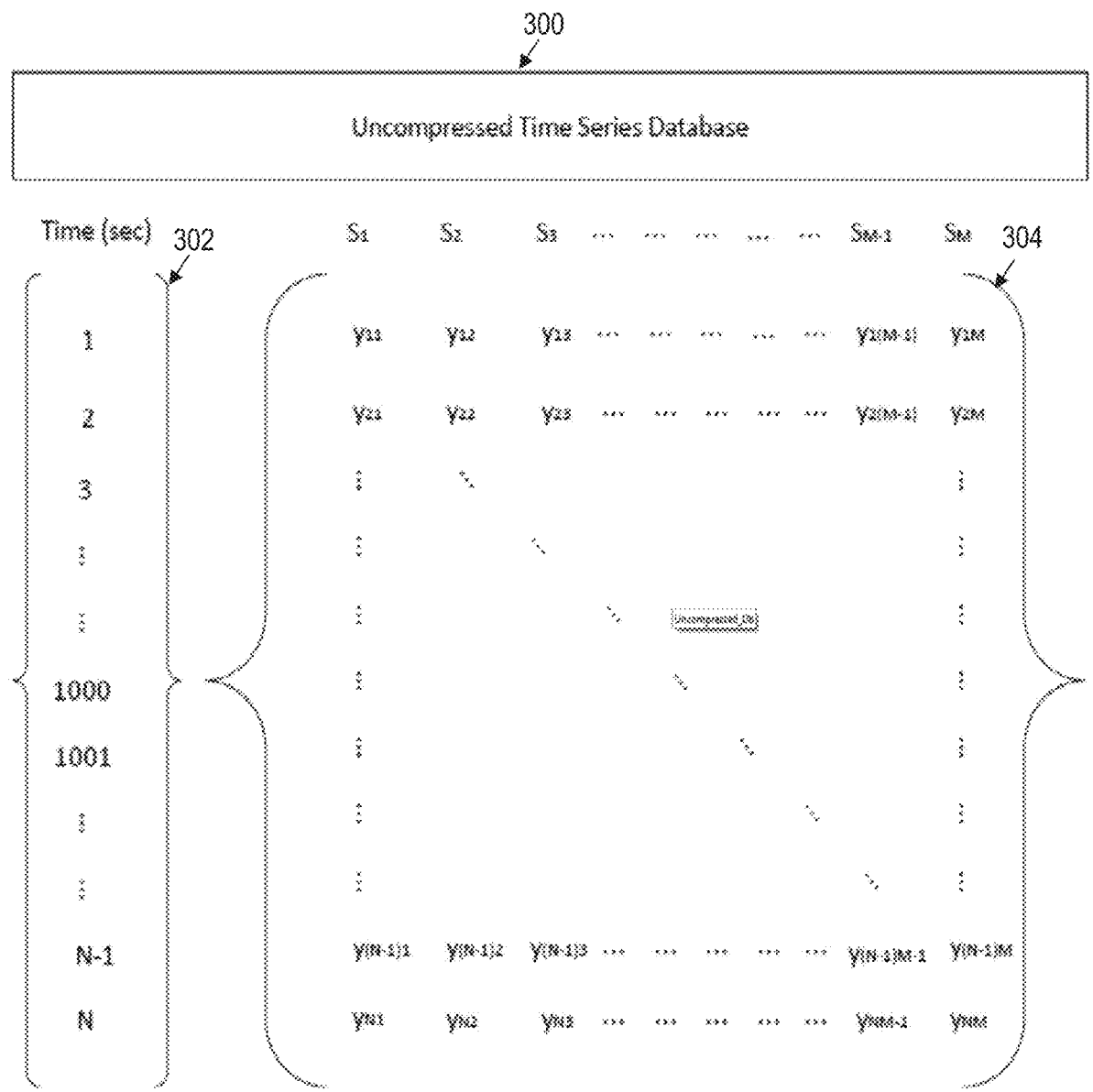
FIG. 3A illustrates a matrix representation of an uncompressed signal in accordance with some embodiments.

FIG. 3A illustrates a matrix representation of an uncompressed signal in accordance with some embodiments. Uncompressed time-series database 300 includes a set of sample values captured from multiple sensors. Time vector 302 has values that increase by increments of one. The values within time vector 302 correspond to a constant sample rate of N where the first time is k, the second is 2k, increasing up to Nk. Matrix 304 includes M columns, with each column corresponding to a different sensor. Each column stores N observations captured by the corresponding sensor at the respective time indices in time vector 302.

Figure 3B:
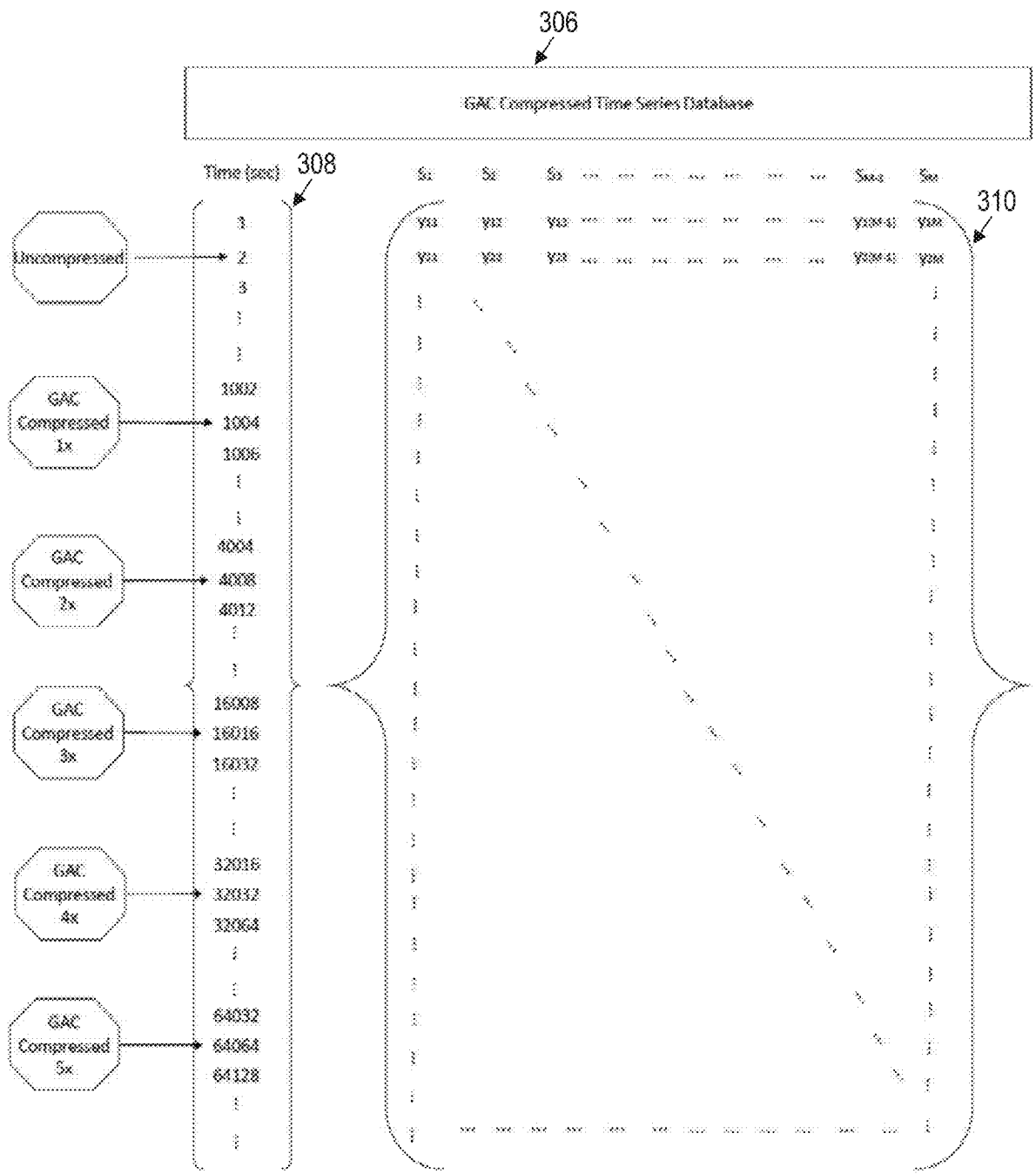
FIG. 3B illustrates a matrix representation of a database where geometric aging compression has been applied and a time vector indicating the reduction in the sample rate as the observations increase in age in accordance with some embodiments.

FIG. 3B illustrates a matrix representation of a database where geometric aging compression has been applied and a time vector indicating the reduction in the sample rate as the observations increase in age in accordance with some embodiments. To generate GAC compressed time-series database 306, GAC compression is run at varying levels for different observations based on age. Time vector 308 illustrates the different levels of GAC compression applied to different sample times. In the illustrated example, the first 1000 or so samples are uncompressed, GAC compression is run once for the next 3000 or so samples for each of the sensors, twice for the next set of samples, three times for the next set, etc. Thus, older portions of a time-series signal are more significantly reduced than more recent portions of the time-series signal. The resulting matrix 308 includes M time-series signals, where each time-series includes a combination of uncompressed observations and observations reduced geometrically at varying levels as a function of age.

As previously mentioned, the GAC process may be run responsive to detecting that a storage threshold has been reached. For example, the GAC process may run when system 100 detects that 95% of storage allocated to store time-series data is full. However, the storage threshold may vary depending on the particular implementation. In other embodiments, the GAC process may be run on-demand, periodically, or triggered by an event, such as detecting a batch upload of new sensor data.

In some embodiments, the GAC process captures and stores statistical information associated with each compressed portion of a time-series signal. For example, the GAC process may store, for each compressed portion, the variance, mean, maximum, minimum, standard deviation, and/or other statistical attributes. Metrics associated with the uncompressed form may thus be preserved after compression even if not directly derivable from the compressed data. These metrics may be referred to as "virtual" metrics as they are associated with the reduced dataset but computed from the uncompressed data. One of more of the virtual metrics may be used as features during ML training.

In some embodiments, the GAC process discards the oldest portion of a time-series signal. For example, the GAC process may discard data points for which GAC compression has been applied more than a threshold number of times or data points that are older than a threshold age. Removing older data points may help free storage to capture patterns in more recent and relevant observations.

4. INTEGRATION WITH MACHINE LEARNING MODELS

In some embodiments, GAC-reduced time-series data is used to train, evaluate, and apply ML models. The GAC-reduced time-series significantly maintains the shape of a signal, retaining statistically significant information include trend and correlation patterns. Thus, the GAC-reduced time-series data may be used to form ML feature vectors without uncompressing the time-series data.

In streaming applications, after GAC is initially applied to a signal database, more data may be streamed into a cloud container from one or more sensors. If an ML model is trained on the most recent uncompressed data and GAC-reduced data is monitored, the missed alarm probability (MAP) may increase due to the larger mean and variance of the uncompressed data. Conversely, training an ML model with the GAC reduced data to monitor uncompressed signals may result in an increased false alarm probability (FAP) due to the smaller mean and variance of the GAC-reduced signals. To bypass decompressing older observations while increasing the accuracy of ML model predictions, the training data may be constructed whereby the most recent data is appended, in a non-compressed format, to the older GAC-reduced data. The oldest observations may be located at the end of the training set while the current observations are at the beginning. Structuring the training data in this manner allows the system to model both the reduced signals and the non-compressed signals, rustling in more efficient data storage for larger and more generalized data with reduced MAP and FAP for analysis.

Figure 4:
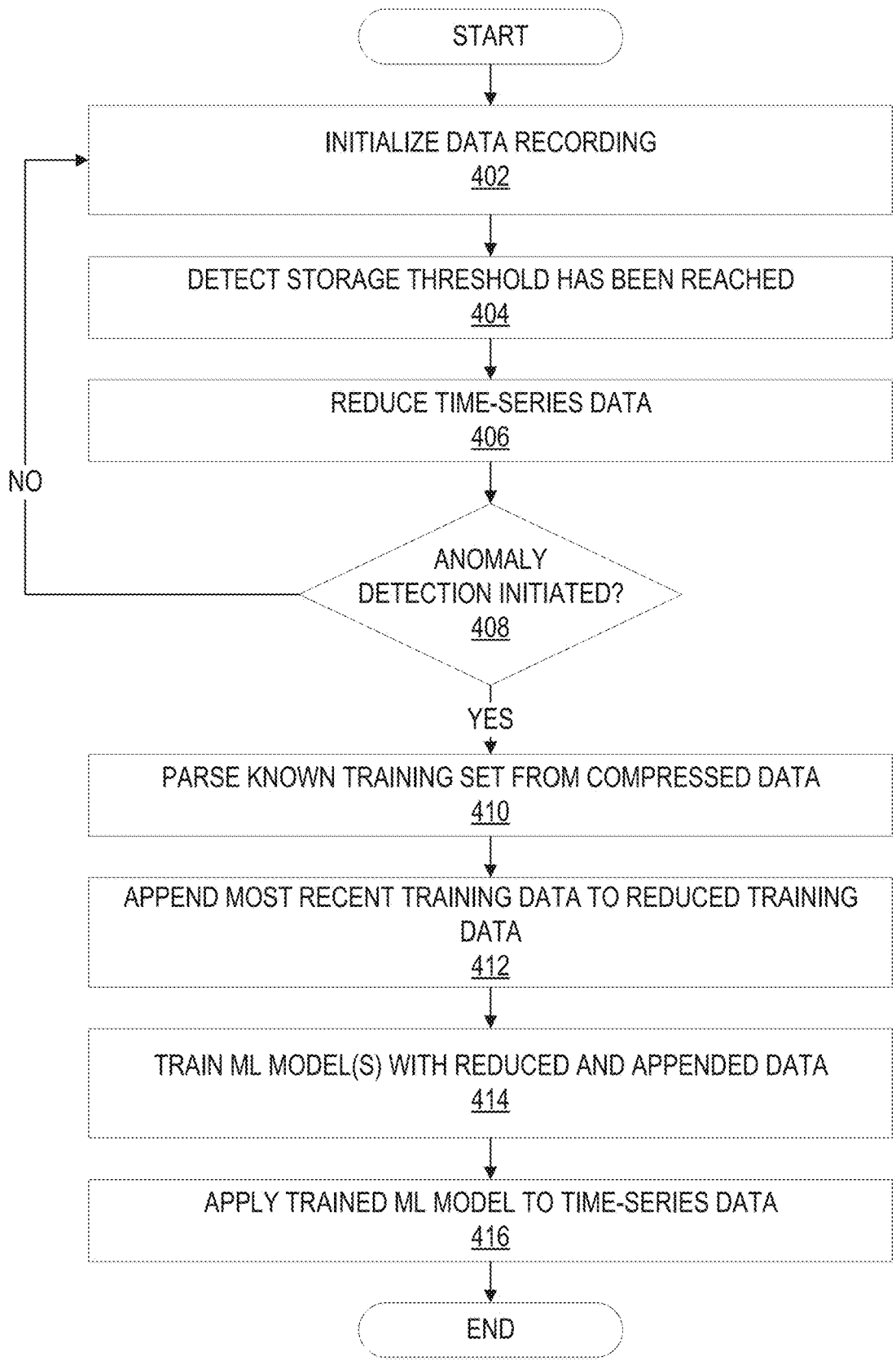
FIG. 4 illustrates an example process for training and applying machine learning models using geometrically reduced datasets in accordance with some embodiments.

FIG. 4 illustrates an example process for training and applying machine learning models using geometrically reduced datasets in accordance with some embodiments. One or more operations illustrated in FIG. 4 may be modified, rearranged, or omitted all together. Accordingly, the particular sequence of operations illustrated in FIG. 4 should not be construed as limiting the scope of one or more embodiments.

Referring to FIG. 4, the process initializes data recording (operation 402). During recording, sensor observations for one or more sensors may be stored in a data repository, such as a time-series database. In the context of a server system, for instance, the sensors may capture CPU metrics, memory throughput, active database sessions, database response times, network latency, and/or other performance metrics. As previously indicated, the metrics that recorded may vary depending on the embedded sensors and asset being monitored.

While recording sensor data, the process monitors and detects when a storage threshold has been reached (operation 404). The threshold may be percentage-based (e.g., 90% of storage space allocated to tenant) or based on data consumption (e.g., 10 TBs of data). The threshold may vary from implementation to implementation and be configurable by a user.

Responsive to detecting that the storage threshold is satisfied, the process GAC-reduces the recorded time-series data (operation 406). The process depicted in FIG. 2 may be executed on the recorded time-series data to reduce the signal storage overhead.

Once reduced, the process determines whether to initiate anomaly detection (operation 408) either by the client, periodically, each time compression occurs, or some other predetermined catalyst. If anomaly detection is not initiated, then the process continues recording data updating the dataset. New data is retained in uncompressed form at this stage.

If an anomaly is initiated, then the process parses the known training data from the compressed data (operation 410). The known training data in this context refers to sample values that were previously used to train an ML model.

The process next appends the most recent training data to the GAC-reduced training data (operation 412). In some embodiments, the process outputs a training set that is sorted temporally by most recent observations to observations further away in time and from uncompressed to most compressed.

The process uses the new training set to train one or more ML models (operation 414). The models that are trained may vary depending on the particular implementation. In some embodiments, the process trains a deterministic ML model, such as a Multivariate State Estimation Technique (MSET) or MSET-2 model. Deterministic models allow for forward/backward tracing with relatively low computational/storage costs compared to stochastic optimization models, such as neural networks and support vector machines. The MSET model is described further in U.S. Pat. No. 5,764,509, titled "Industrial Process Surveillance System", previously incorporated by reference. Additionally or alternatively, the process may train other ML models, such as artificial neural networks, decision trees, and support vector machines (SVMs). The ML training process may generally comprise separating the dataset into training examples and test examples. The training process may generate ML feature vectors for each example based on the training data, statistical values (e.g., variance, mean, correlation coefficients), virtual metrics, and/or other attributes associated with the training data. The training process may then generate a set of candidate ML model parameters, such as weights and biases, based on the training examples. The candidate ML model parameters that yield the lowest estimate error relative to the test examples may be selected to apply to new examples.

Once the ML model is trained, the process applies the ML model to newly received or hypothetical time-series data (operation 416). All or a portion of the time-series data may be GAC-reduced before the ML model is applied. In other embodiments, the ML model may be applied to uncompressed data. Thus, the process may use the trained ML model to monitor both recent uncompressed observations and compressed observations for anomalies resulting in a streamlined and storage efficient ML analysis.

Figure 5:
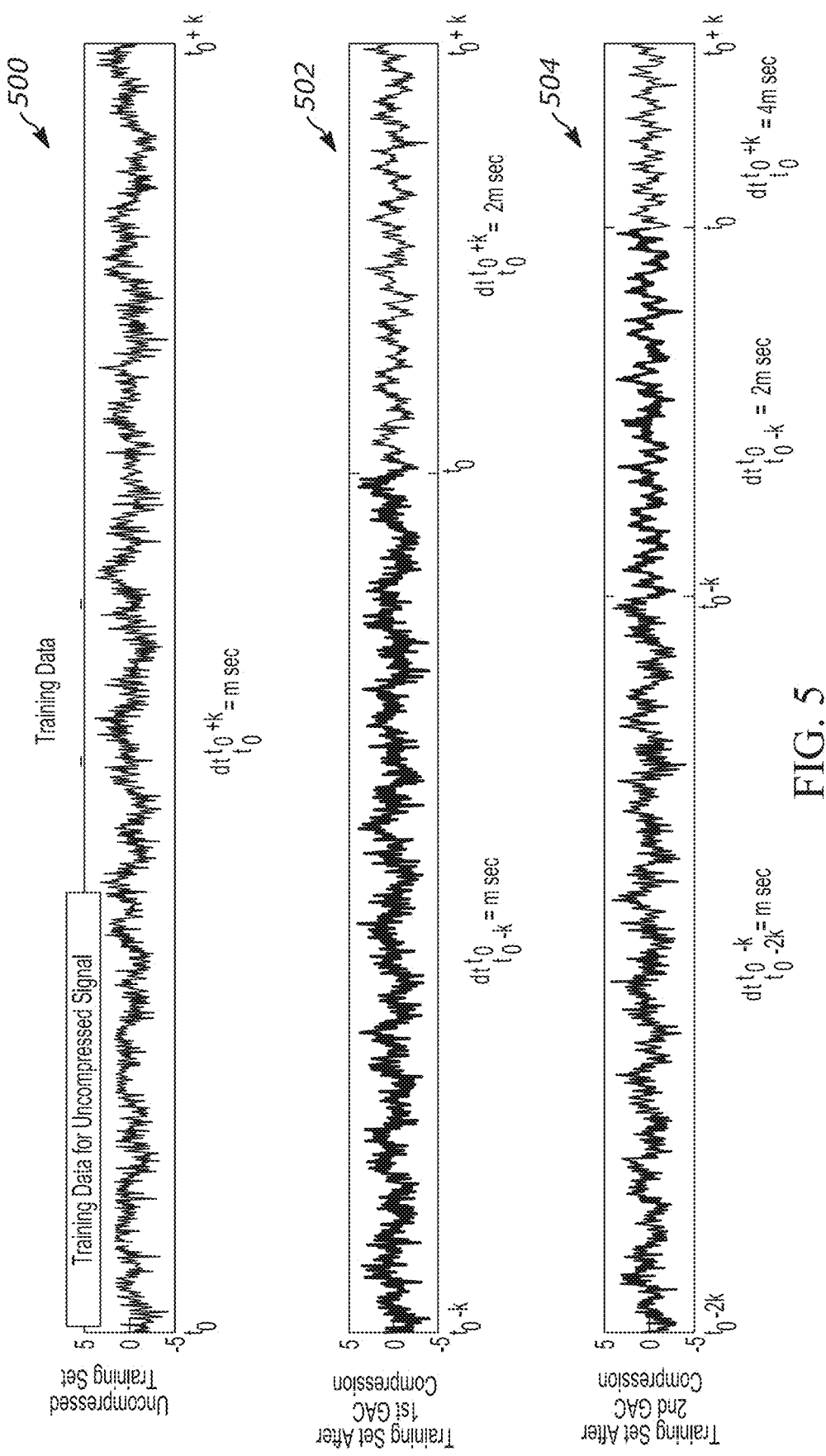
FIG. 5 illustrates how training data changes as a data storage threshold is crossed and geometric aging reduction is applied in accordance with some embodiments.
Figure 5:
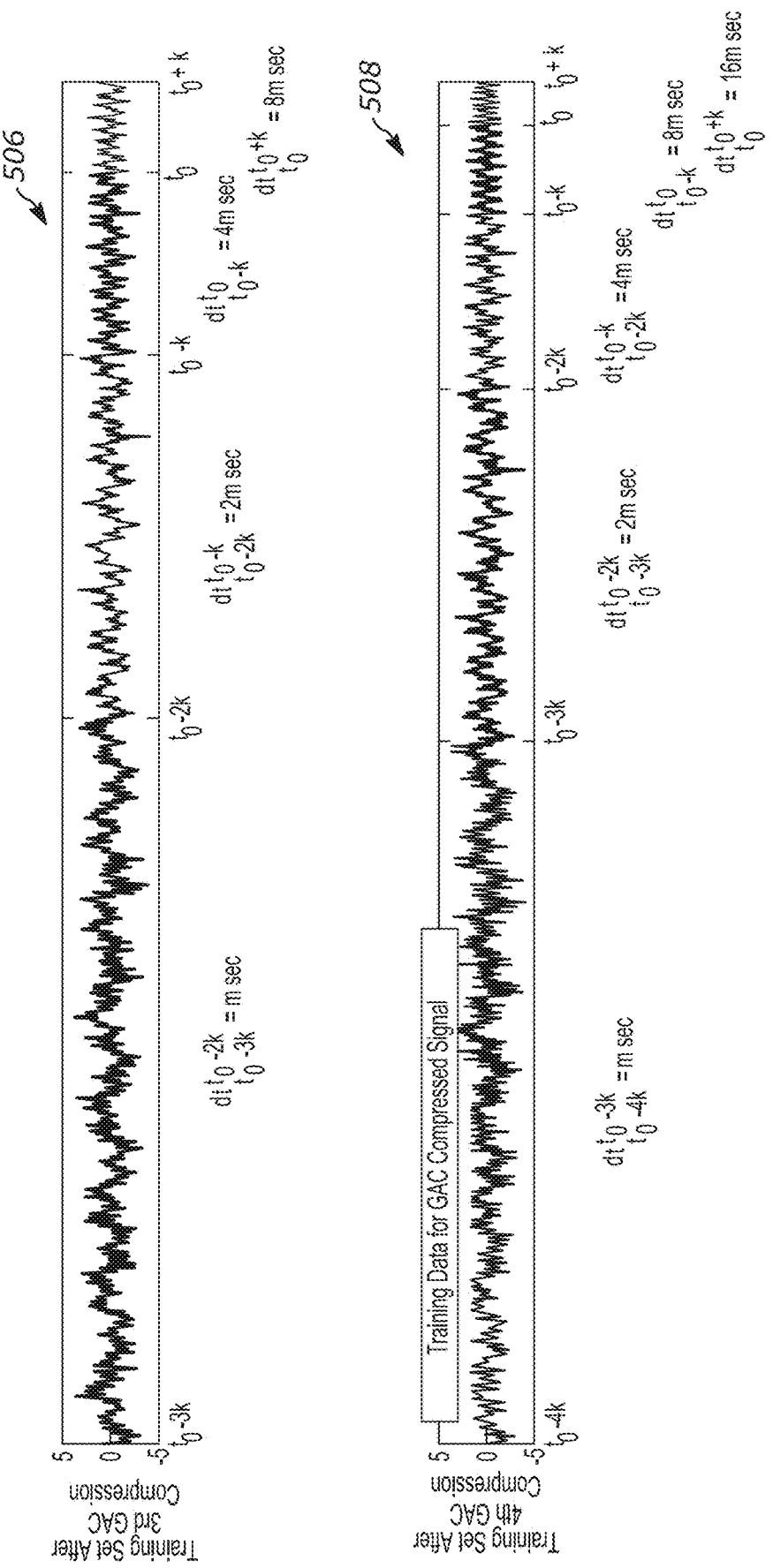

FIG. 5 illustrates how training data changes as a data storage threshold is cross and geometric aging reduction is applied in accordance with some embodiments. Referring to FIG. 5, subplot 500 illustrates the original training dataset, uncompressed, recording for k seconds and m number of samples. After m seconds, the data storage threshold is reached, GAC is applied, and the number of samples is reduced to m/2. New observations are also recorded, indicated by the green (most recent) portion of the signal shown in subplot 502. Once new observations are recorded or m seconds, the storage threshold is triggered and GAC is applied again. The result is a new signal that is now 2k seconds long, but the first m seconds are sampled at m/2 and the second m seconds are sampled at a rate of m/4. The new observations, indicated by a new color in subplot 504, are appended to the GAC-reduced signal. Subplot 506 and subplot 508 show the process iterated two additional times. As may be seen, the training dataset includes a plurality of portions, each portion corresponding to a different window of time and having a different level of compression with the most recent observations being uncompressed. The original training dataset shown in subplot 500 becomes more and more compressed as it ages and new observations are appended to the training dataset. Stated another way, the size of older datasets is reduced by estimating the older datasets (which may comprise a portion of a time-series signal) with reduced data frequency. One sample value may thus span a greater sub-period in the older datasets than in more recent datasets.

In some embodiments, the trained ML model monitors assets for anomalous behavior indicative of degradation or other problematic issues. For example, the ML model may detect if two or more signals are exhibiting unexpected correlation patterns or are unexpectedly uncorrelated. Additionally or alternatively, the ML model may monitor for unexpected changes in trends, seasonality, and/or other statistical patterns in the metric data. The artificial intelligence system may be employed on reduced and non-reduced datasets alike to detect and/or predict multivariate anomalies.

If the ML model detects an anomaly, then system 100 may output an alert to notify a user. In some embodiments system 100 may provide information related to the alert such as which sensors were involved in triggering the alert, the metric values associated with the alert, a timestamp when the alert first triggered, and/or a duration for the alert. Additionally or alternatively, the ML model may provide analytic descriptions for the alert. As an example, CPU utilization and number of active database sessions may be strongly correlated in certain systems. This pattern may be learned by the ML model, which may then detect that the CPU utilization and number active database sessions have become unexpectedly uncorrelated. The ML model may output an alert with a corresponding description mapped to cause of the alert, such as "Warning: CPU utilization has significantly increased even though the number of active database sessions remains low." The information may help the user isolate the root cause of the alert and take corrective action, if needed, to address system degradation or other performance issues. The information that is presented may vary depending on the asset, sensor values, the learned patterns. Thus, the artificial intelligence system may be employed on reduced and non-reduced datasets alike to detect and/or predict multivariate anomalies.

Additionally or alternatively, the output of the ML model may trigger one or more downstream automated actions. For example, if the ML model forecasts a significant increase in resource utilization in a datacenter environment, additional server resources may be brought online, traffic may be directed to other sites, system configurations may be adjusted to accommodate a higher anticipated load, and/or other preemptive actions may be taken. As another example, if anomalous system degradation is detected, then system resources may be shutdown and/or migrated to other resources. Other actions may include consolidating resources, changing security policies, and/or otherwise adjusting system configurations.

5. EXAMPLE SIGNAL REDUCTION AND ML MODEL PERFORMANCE

Examples application of the above techniques is provided herein. Two signals are depicted herein for brevity. However, as previously indicated, an asset may have a significant number of embedded sensors, each producing a separate time-series signal.

Figure 6:
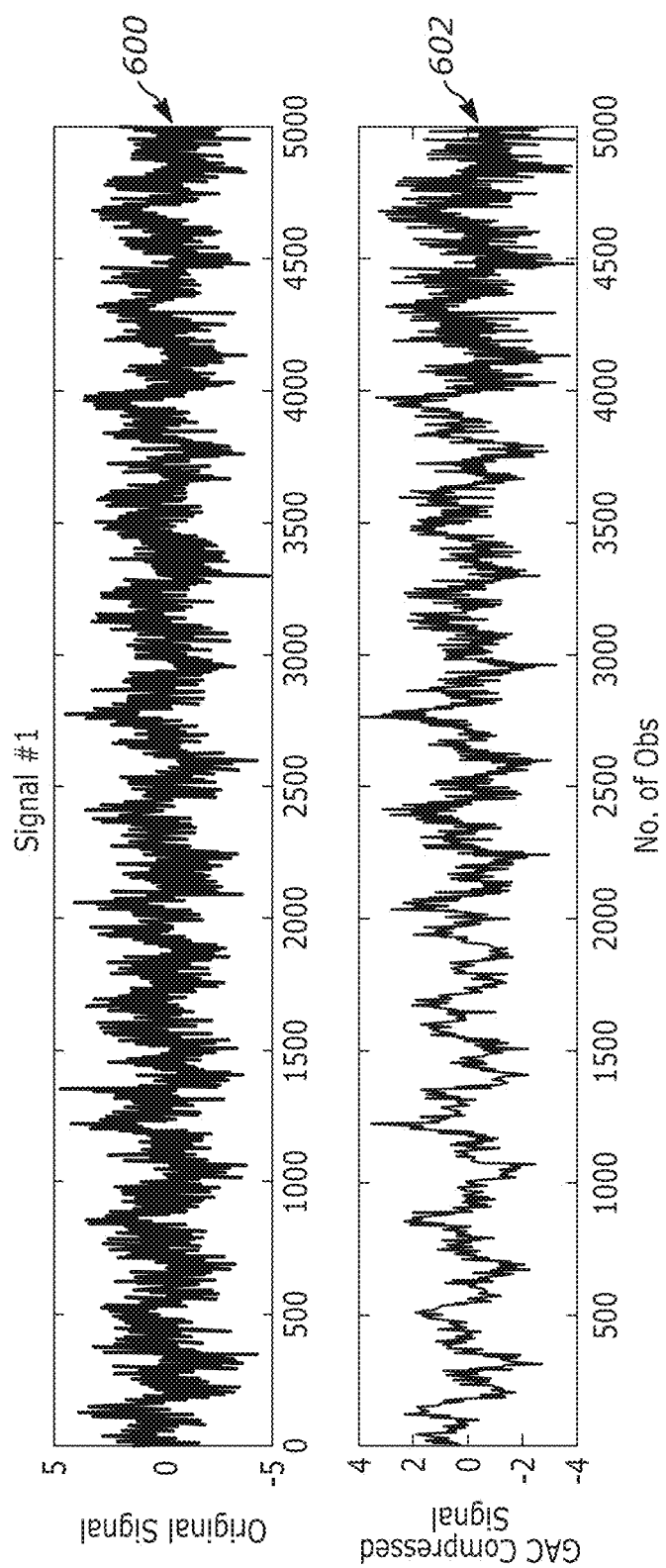
FIG. 6 illustrates a signal without degradation in uncompressed and reduced forms in accordance with some embodiments.

FIG. 6 illustrates a signal without degradation in uncompressed and reduced forms in accordance with some embodiments. Subplot 600 depicts the time-series signal in uncompressed form, and subplot 602 depicts the GAC-reduced signal. As illustrated, the shape of the GAC-reduced signal significantly matches that of the uncompressed signal, with statistical patterns such as trend rate being maintained.

Figure 7:
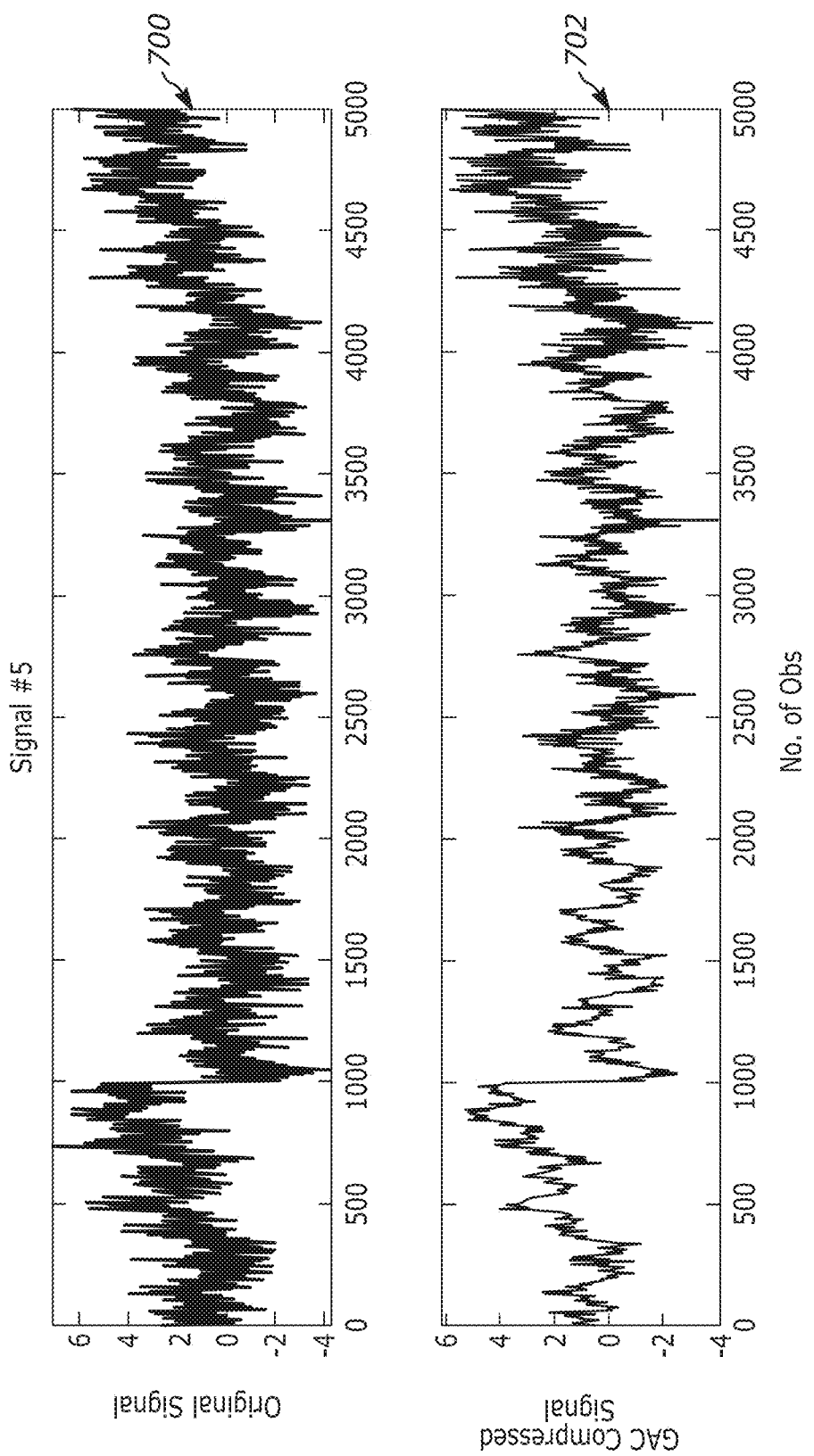
FIG. 7 illustrates a degraded signal in uncompressed and reduced forms in accordance with some embodiments.

FIG. 7 illustrates a degraded signal in uncompressed and reduced forms in accordance with some embodiments. Subplot 700 depicts the time-series signal in uncompressed form, and subplot 702 depicts the GAC-reduced signal. Degradation of the signal was artificially constructed by inserting two ramps, 900 observations long, at the $100^{th}$ observation and the $4100^{th}$ observation, respectively. The two ramps illustrate the viability of monitoring the GAC-reduced signals using the training construction illustrated in FIG. 5. Inserting the ramp in the first 1000 observations allowed one ramp to be compressed twice while a second ramp remained uncompressed.

Figure 8A:
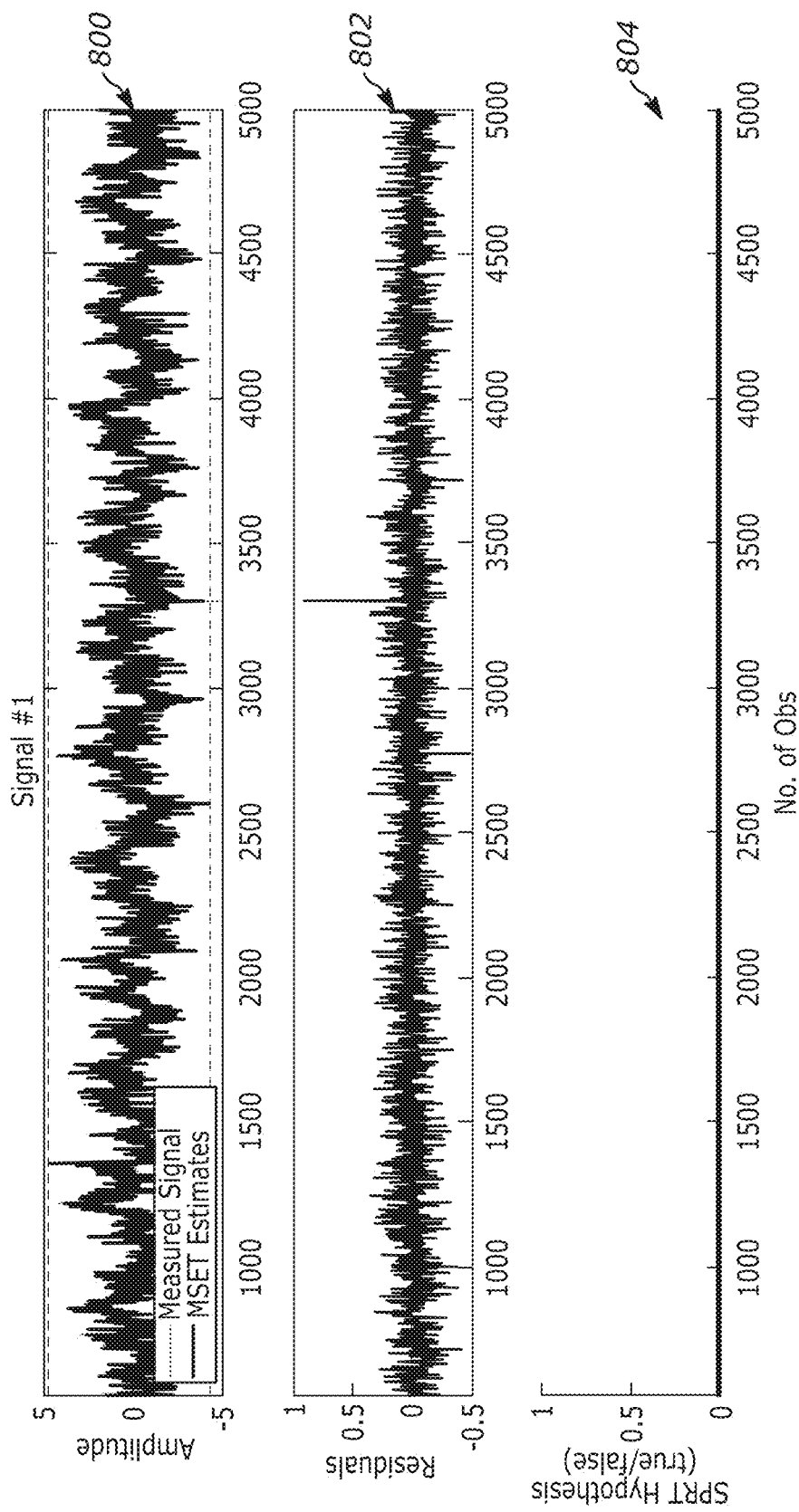
FIG. 8A illustrates a first set of subplots based on the output of a machine learning model compared to an undegraded measured signal in accordance with some embodiments.

FIG. 8A illustrates model results for an uncompressed, continuously streaming signal without degradation in accordance with some embodiments. Subplot 800 illustrates the ML model output compared to the monitored signal. Subplot 802 illustrates the resulting residuals, which may be computed as the difference between the ML output and the observed value. Subplot 804 illustrates Sequential Probability Ratio Test (SPRT) alarms generated based on the ML output. In this example, no alarms are triggered for the nondegraded signal.

Figure 8B:
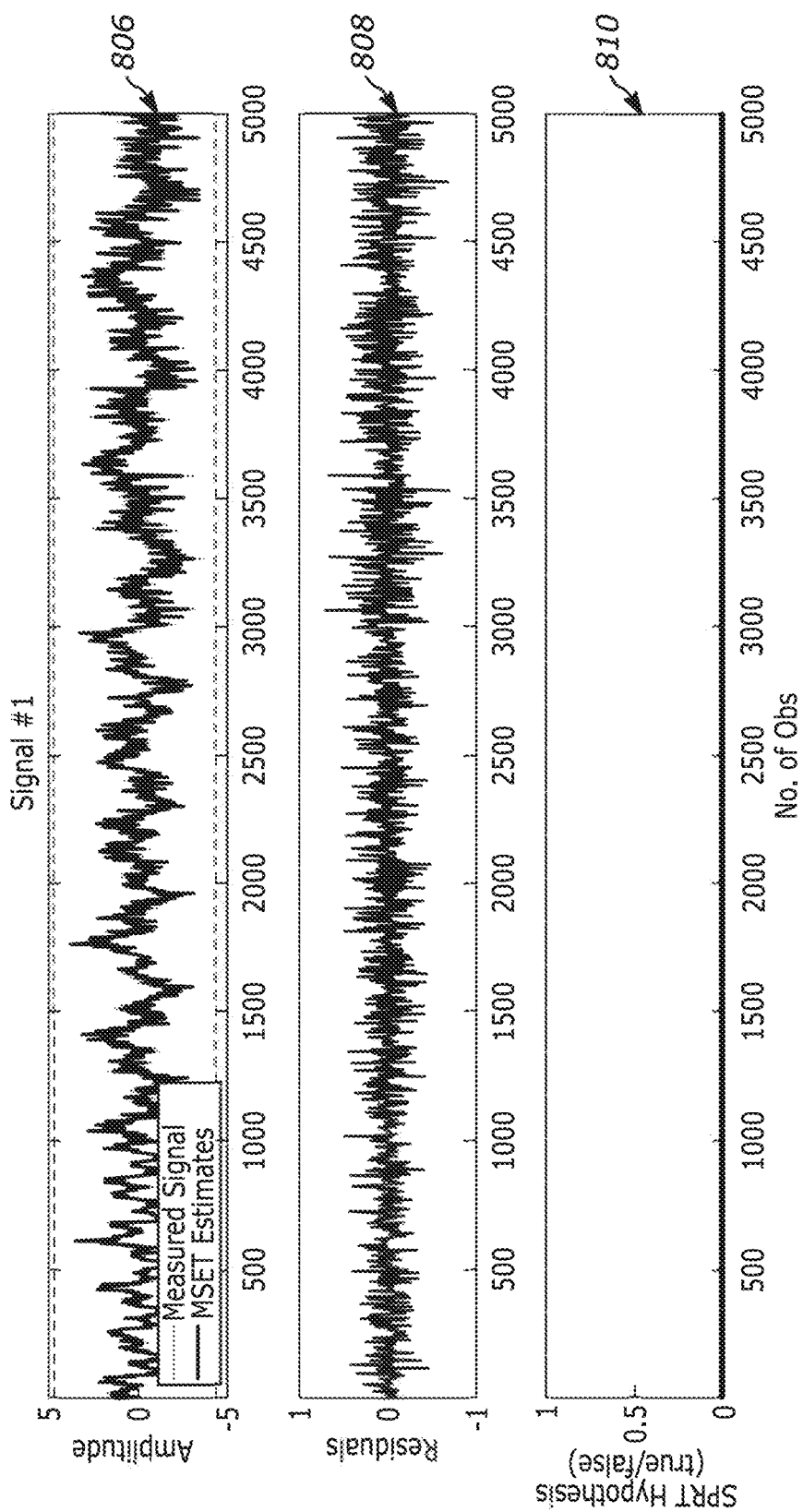
FIG. 8B illustrates a second set of subplots based on the output of a machine learning model compared to an undegraded compressed measured signal in accordance with some embodiments.

FIG. 8B illustrates model results for a GAC-reduced signal without degradation in accordance with some embodiments. Subplot 806 illustrates the ML model output compared to the GAC-reduced signal, subplot 808 illustrates the residual values, and subplot 810 illustrates the SPRT alarms. As can be seen, the ML output using GAC-reduced data for training significantly matches the results when using uncompressed data for training. Thus, no false alarms are generated.

Figure 9A:
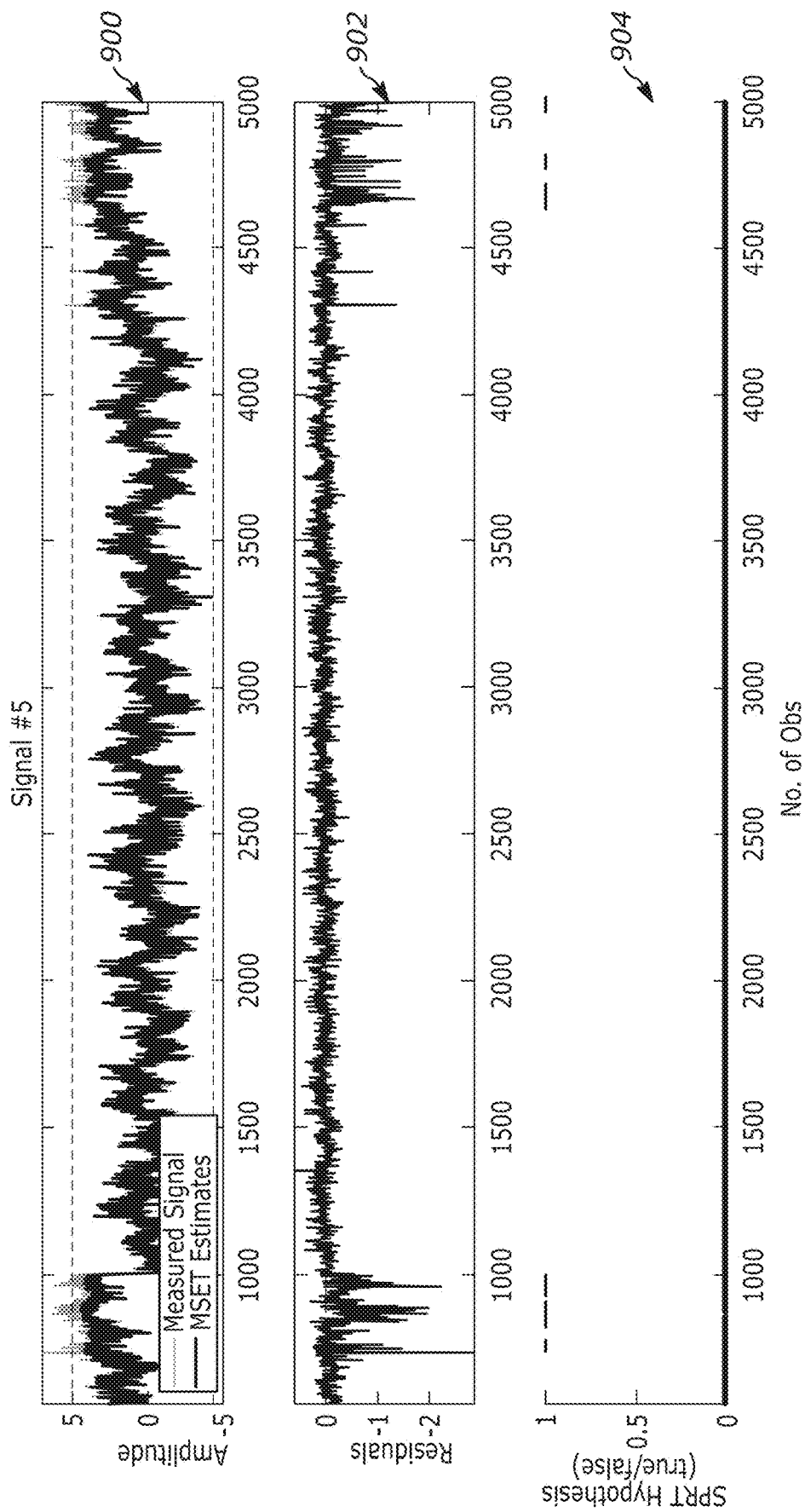
FIG. 9A illustrates a first set of subplots based on the output of a machine learning model compared to a degraded measured signal in accordance with some embodiments.

FIG. 9A illustrates model results for an uncompressed, continuously streaming signal with degradation in accordance with some embodiments. Subplot 900 illustrates the ML model output compared to the monitored signal. Subplot 902 illustrates the resulting residuals, which may be computed as the difference between the ML output and the observed value. Subplot 904 illustrates Sequential Probability Ratio Test (SPRT) alarms generated based on the ML output. In this example, the ramps inserted into the data cause SPRT alarms to alert a user to the signal degradation.

Figure 9B:
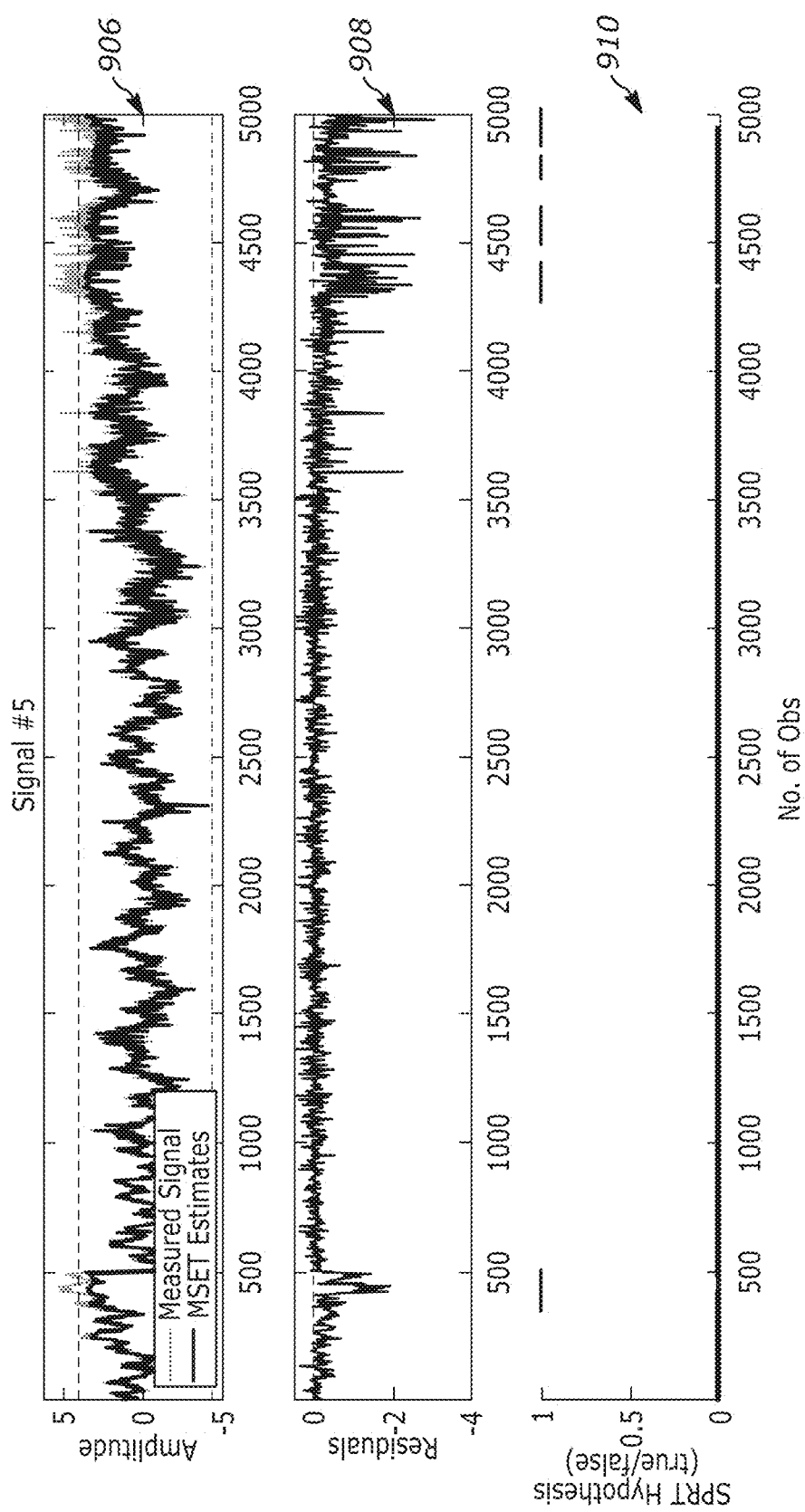
FIG. 9B illustrates a second set of subplots based on the output of a machine learning model compared to a degraded compressed measured signal in accordance with some embodiments.

FIG. 9B illustrates model results for a GAC-reduced signal with degradation in accordance with some embodiments. Subplot 906 illustrates the ML model output compared to the GAC-reduced signal, subplot 908 illustrates the residual values, and subplot 910 illustrates the SPRT alarms. As can be seen, the ML output using GAC-reduced data for training significantly matches the results when using uncompressed data for training. The process does not generate false alarms or miss expected alarms using the reduced dataset.

6. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. MICRO SERVICE APPLICATIONS

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In some embodiments, the trigger, when satisfied, might output data for consumption by the target microservice. In other embodiments, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 10 is a block diagram that illustrates computer system 1000 upon which an embodiment of the invention may be implemented. Computer system 1000 includes bus 1002 or other communication mechanism for communicating information, and a hardware processor 1004 coupled with bus 1002 for processing information. Hardware processor 1004 may be, for example, a general-purpose microprocessor.

Computer system 1000 also includes main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes read only memory (ROM) 1008 or other static storage device coupled to bus 1002 for storing static information and instructions for processor 1004. Storage device 1010, such as a magnetic disk or optical disk, is provided and coupled to bus 1002 for storing information and instructions.

Computer system 1000 may be coupled via bus 1002 to display 1012, such as a cathode ray tube (CRT) or light emitting diode (LED) monitor, for displaying information to a computer user. Input device 1014, which may include alphanumeric and other keys, is coupled to bus 1002 for communicating information and command selections to processor 1004. Another type of user input device is cursor control 1016, such as a mouse, a trackball, touchscreen, or cursor direction keys for communicating direction information and command selections to processor 1004 and for controlling cursor movement on display 1012. Input device 1014 typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a network line, such as a telephone line, a fiber optic cable, or a coaxial cable, using a modem. A modem local to computer system 1000 can receive the data on the network line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

9. MISCELLANEOUS; EXTENSIONS

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a first time-series dataset that tracks at least one metric value over time;
   generating a second time-series dataset that includes a reduced version of a first portion of the first time-series dataset and a non-reduced version of a second portion of the first time-series dataset, wherein the second portion of the first time-series dataset includes metric values that are more recent than the first portion of the first time-series dataset;
   determining one or more virtual metrics for the first portion of the first time-series dataset based on a non-reduced version of the first portion of the first time-series dataset, wherein the one or more virtual metrics are not discernable from the reduced version of the first portion of the first time-series dataset; and
   training at least one machine learning model using the second time-series dataset that includes the reduced version of the first portion of the first time-series dataset and the non-reduced version of the second portion of the first time-series dataset.

2. The method of claim 1, further comprising: generating the reduced version of the first portion of the first time-series dataset by merging adjacent values in the first portion of the first time-series dataset.

3. The method of claim 2, wherein merging adjacent values comprises averaging adjacent pairwise values.

4. The method of claim 2, further comprising: appending the second portion of the first time-series dataset to the first portion of the first time-series dataset.

5. The method of claim 1, wherein the second time-series dataset includes a version of a third portion of the first time-series dataset that has been reduced multiple times, wherein the third portion of the first time-series dataset includes metric values that are older than the first portion and second portion of the first time-series dataset.

6. The method of claim 1, further comprising: discarding the non-reduced version of the first portion of the dataset.

7. The method of claim 1, further comprising: generating the reduced version of the first portion of the first time-series dataset responsive to determining that a storage threshold has been reached.

8. The method of claim 1, further comprising: applying the machine learning model to at least a third time-series dataset; and generating an alert based on the output of the machine learning model indicative of anomalous behavior associated with the third time-series dataset.

9. The method of claim 1, wherein the one or more virtual metrics include at least one of a variance, mean, maximum, minimum, or standard deviation associated with the non-reduced version of the first portion of the first time-series dataset; wherein the one or more virtual metrics are preserved after discarding the non-reduced version of the first portion of the first time-series dataset and are used to train the at least one machine learning model.

10. The method of claim 1, wherein the one or more virtual metrics include at least one of a variance, mean, maximum, minimum, or standard deviation associated with the non-reduced version of the first portion of the first time-series dataset; wherein the one or more virtual metrics are preserved after discarding the non-reduced version of the first portion of the first time-series dataset and are used to train the at least one machine learning model.

11. One or more non-transitory computer-readable media storing instructions, which, when executed by one or more hardware processors, cause:
receiving a first time-series dataset that tracks at least one metric value over time;
generating a second time-series dataset that includes a reduced version of a first portion of the first time-series dataset and a non-reduced version of a second portion of the first time-series dataset, wherein the second portion of the first time-series dataset includes metric values that are more recent than the first portion of the first time-series dataset;
determining one or more virtual metrics for the first portion of the first time-series dataset based on a non-reduced version of the first portion of the first time-series dataset, wherein the one or more virtual metrics are not discernable from the reduced version of the first portion of the first time-series dataset; and
training at least one machine learning model using the second time-series dataset that includes the reduced version of the first portion of the first time-series dataset and the non-reduced version of the second portion of the first time-series dataset.

12. The one or more non-transitory computer-readable media of claim 11, wherein the instructions further cause: generating the reduced version of the first portion of the first time-series dataset by merging adjacent values in the first portion of the first time-series dataset.

13. The one or more non-transitory computer-readable media of claim 12, wherein merging adjacent values comprises averaging adjacent pairwise values.

14. The one or more non-transitory computer-readable media of claim 12, wherein the instructions further cause: appending the second portion of the first time-series dataset to the first portion of the first time-series dataset.

15. The one or more non-transitory computer-readable media of claim 11, wherein the second time-series dataset includes a version of a third portion of the first time-series dataset that has been reduced multiple times, wherein the third portion of the first time-series dataset includes metric values that are older than the first portion and second portion of the first time-series dataset.

16. The one or more non-transitory computer-readable media of claim 11, wherein the instructions further cause: discarding the non-reduced version of the first portion of the dataset.

17. The one or more non-transitory computer-readable media of claim 11, wherein the instructions further cause: generating the reduced version of the first portion of the first time-series dataset responsive to determining that a storage threshold has been reached.

18. The one or more non-transitory computer-readable media of claim 11, wherein the instructions further cause: applying the machine learning model to at least a third time-series dataset; and generating an alert based on the output of the machine learning model indicative of anomalous behavior associated with the third time-series dataset.

19. A system comprising:
one or more hardware processors;
one or more non-transitory computer-readable media storing instructions, which, when executed by one or more hardware processors, cause performance of operations comprising:
receiving a first time-series dataset that tracks at least one metric value over time;
generating a second time-series dataset that includes a reduced version of a first portion of the first time-series dataset and a non-reduced version of a second portion of the first time-series dataset, wherein the second portion of the first time-series dataset includes metric values that are more recent than the first portion of the first time-series dataset;
determining one or more virtual metrics for the first portion of the first time-series dataset based on a non-reduced version of the first portion of the first time-series dataset, wherein the one or more virtual metrics are not discernable from the reduced version of the first portion of the first time-series dataset; and
training at least one machine learning model using the second time-series dataset that includes the reduced version of the first portion of the first time-series dataset and the non-reduced version of the second portion of the first time-series dataset.

20. The system of claim 19, wherein the instructions further cause: generating the reduced version of the first portion of the first time-series dataset by merging adjacent values in the first portion of the first time-series dataset.

* * * * *